US007583952B2

(12) United States Patent
Lee et al.

(10) Patent No.: US 7,583,952 B2
(45) Date of Patent: Sep. 1, 2009

(54) ACCESS POINTER FOR INTERCONNECTING POWER LINE COMMUNICATION NETWORK AND WIRELESS NETWORK AND METHOD THEREFOR

(75) Inventors: Hyung Kyu Lee, Daejeon (KR); Jong Wook Han, Daejeon (KR); Jong Soo Jang, Daejeon (KR); Sung Won Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 507 days.

(21) Appl. No.: 11/286,560

(22) Filed: Nov. 23, 2005

(65) Prior Publication Data

US 2006/0286958 A1  Dec. 21, 2006

(30) Foreign Application Priority Data

Jun. 17, 2005  (KR) .................. 10-2005-0052574

(51) Int. Cl.
*H04M 9/00* (2006.01)
*H04Q 7/20* (2006.01)

(52) U.S. Cl. .................. 455/402; 340/310.11; 340/538; 375/222

(58) Field of Classification Search .................. 455/402; 340/310.01, 310.06, 310.08, 310.11, 310.16, 340/538, 538.15; 375/222
See application file for complete search history.

(56) References Cited

U.S. PATENT DOCUMENTS

2003/0100288 A1* 5/2003 Tomlinson et al. .......... 455/402
2004/0125870 A1* 7/2004 Yamazaki .................. 375/222

FOREIGN PATENT DOCUMENTS

| KR | 10 2004 0057100 | 7/2004 |
| KR | 10 0435991 | 11/2004 |
| KR | 10 2005 0021628 | 3/2005 |

* cited by examiner

*Primary Examiner*—Lee Nguyen
(74) *Attorney, Agent, or Firm*—Ladas & Parry LLP

(57) ABSTRACT

An access pointer for interconnecting a power line communication (PLC) network of a home network and a wireless network and a method therefor are provided. When data is received from the PLC network through media access control of a data link layer, data on upper layers above a network layer in the received data is converted into a format suitable to a wireless network layer. The converted data is transmitted to the wireless network through the media access control of the data link layer. Accordingly, the PLC network and the wireless network are easily interconnected.

7 Claims, 6 Drawing Sheets

ACCESS POINTER FOR INTERCONNECTING POWER LINE COMMUNICATION NETWORK AND WIRELESS NETWORK AND METHOD THEREFOR

CROSS-REFERENCE TO RELATED PATENT APPLICATIONS

This application claims the benefit of Korean Patent Application No. 10-2005-0052574, filed on Jun. 17, 2005, in the Korean Intellectual Property Office, the disclosure of which is incorporated herein in its entirety by reference.

BACKGROUND OF THE INVENTION

1. Field of the Invention

The present invention relates to an access pointer for interconnecting a power line communication (PLC) network and a wireless network and a method therefor, and more particularly, to an access pointer for interconnecting various devices on a wireless network and a home network implemented by a PLC network and a method therefor.

2. Description of the Related Art

PLC is provided to allow superhigh-speed Internet to be accessed through only an electric outlet, i.e., a power line. PLC provides a method of easily constructing a communication network using a power line that has already been installed at home and is thus used as the most effective means for constituting a home network. A power line based home network provides services on the basis of a home server or a home gateway functioning as the home server. However, to connect a terminal, such as a notebook computer with a wireless local area network (LAN) card, which cannot use an existing PLC network, to the PLC network, the home gateway must support the wireless LAN and must be compatible with the PLC network.

FIG. 1 illustrates a conventional home gateway of a home network simultaneously supporting diverse networks. Referring to FIG. 1, to interconnect the diverse networks, performance of the home gateway needs to be increased very much, which is costly. In addition, to add a new network to the home network, a new home gateway is needed and network setting needs to be changed inconveniently. If replacement of a home gateway is costly, the conventional structure shown in FIG. 1 may hamper the wide spread of the home network very much, and it will be very difficult to expand the home network.

SUMMARY OF THE INVENTION

The present invention provides an access pointer, which is implemented in a plug form connectable with an electric outlet, for interconnecting a power line communication (PLC) network and a wireless network by converting data on a network layer, and a method therefor.

According to an aspect of the present invention, there is provided an access pointer for interconnecting a PLC network and a wireless network. The access pointer includes a PLC module transmitting and receiving data to and from the PLC network through media access control of a data link layer; a wireless communication module transmitting and receiving data to and from the wireless network through media access control of a data link layer; and a conversion gateway converting data on upper layers above a network layer among the data received through the PLC module into a format suitable for a wireless network layer, outputting the converted data to the wireless communication module, converting data on upper layers above the network layer among the data received through the wireless communication module into a format suitable for a PLC network layer, and outputting the converted data to the PLC module.

According to another aspect of the present invention, there is provided a method of interconnecting a PLC network and a wireless network. The method includes receiving data from the PLC network through media access control of a data link layer, converting data on upper layers above a network layer in the received data into a format suitable to a wireless network layer, and transmitting the converted data to the wireless network through the media access control of the data link layer.

Accordingly, the PLC network and the wireless network are easily interconnected.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, preferred embodiments of the present invention will be described in detail with reference to the attached drawings.

Figure 1:
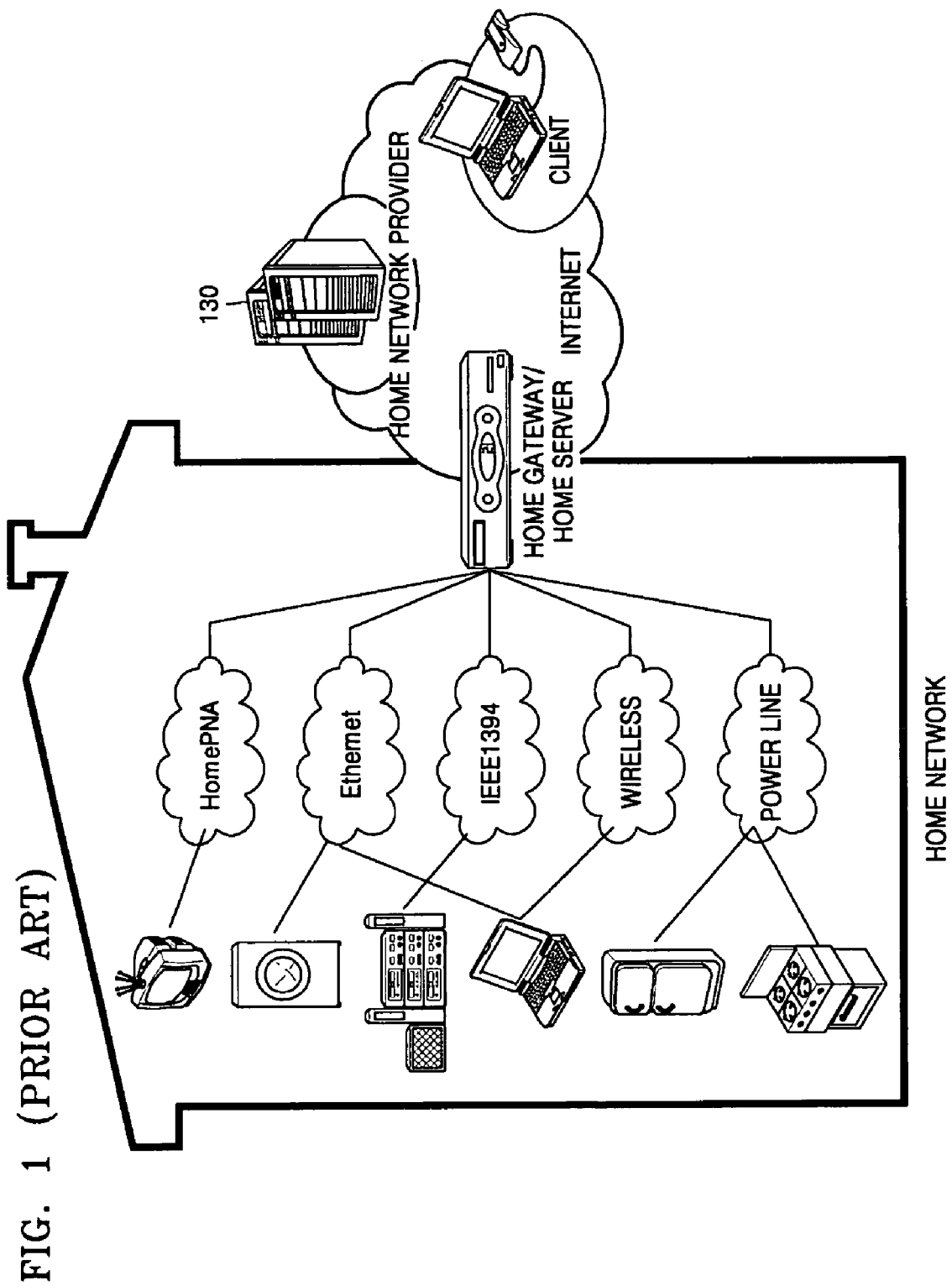
FIG. 1 illustrates a conventional home gateway of a home network simultaneously supporting diverse networks.
Figure 2:
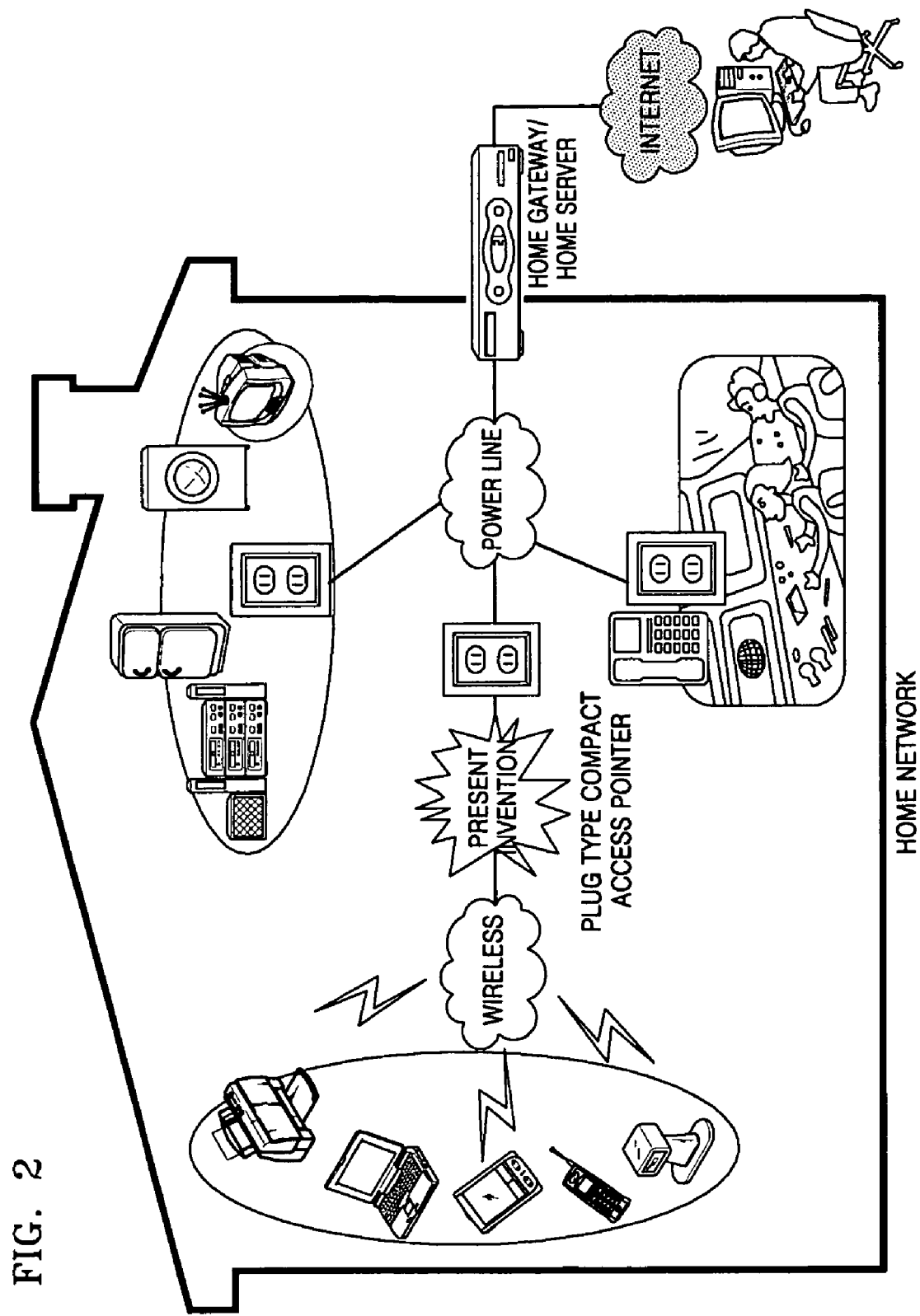
FIG. 2 illustrates the structure of a home network using the present invention.

FIG. 2 illustrates the structure of a home network using the present invention. Referring to FIG. 2, an access pointer of the present invention is connected to an electric outlet and interconnects diverse devices (e.g., a telephone, a personal computer (PC), a refrigerator, a television (TV), etc.) on a PLC network to various devices (e.g., a wireless notebook computer, a personal digital assistant (PDA), etc.) on a wireless network.

Figure 3:
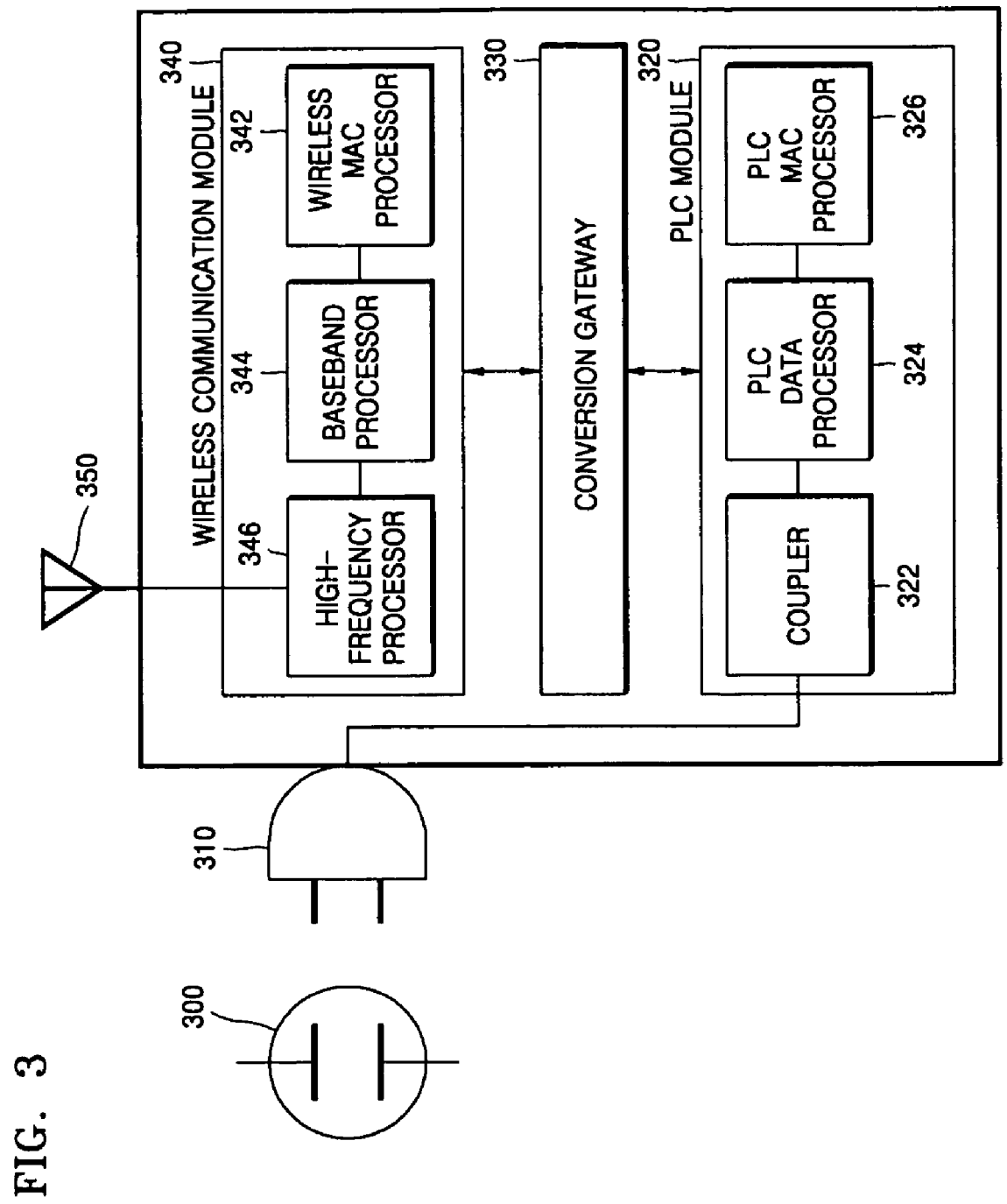
FIG. 3 illustrates the structure of an access pointer according to an embodiment of the present invention.

FIG. 3 illustrates the structure of an access pointer according to an embodiment of the present invention. The access pointer includes a PLC module 320, a conversion gateway 330, and a wireless communication module 340 inside a box shape and a plug 310 and an antenna 350 outside. The plug 310 disposed at one side of the access pointer enables the access pointer to be easily coupled to an electric outlet 300. Since the access pointer is directly connected to the PLC network via the plug 310, it does not need to have a wire for connection to the PLC network. In addition, the access pointer may use power received via the plug 310 without requiring a separate power supply.

The PLC module 320 includes a coupler 322, a PLC data processor 324, and a PLC media access control (MAC) processor 326. The wireless communication module 340 includes a wireless MAC processor 342, a baseband processor 344, and a high-frequency processor 346.

The PLC module 320 receives and transmits data from and to a PLC network through MAC on a data link layer in open system interconnection (OSI). In detail, the coupler 322 separates a data signal from alternating current flowing in a power line of the PLC network connected thereto via the plug 310. The PLC data processor 324 amplifies the data signal separated in an analog format by the coupler 322 and converts the data signal into a digital signal. The PLC MAC processor 326 performs MAC using a MAC address of the digital signal. Transmission of a data signal from a wireless network to the PLC network is performed in a reverse order.

The conversion gateway 330 converts data on a network layer for transmission/reception of data between heterogeneous networks. In other words, data for a PLC network layer is converted into a data on a wireless network layer or vice versa. The conversion gateway 330 will be described in detail with reference to FIGS. 4 and 5 later.

The wireless communication module 340 receives a data signal from a wireless network through wireless access control on a data link layer and provides the data signal to the conversion gateway 330. In addition, the wireless communication module 340 transmits a data signal from the conversion gateway 330 to the wireless network.

In detail, the wireless MAC processor 342 performs MAC on the data signal that has been converted to be suitable to the wireless network layer by the conversion gateway 330 and then outputs the data signal to the baseband processor 344 for processing on a physical layer. The baseband processor 344 modulates the data signal received from the wireless MAC processor 342. The high-frequency processor 346 amplifies the modulated data signal to forward the signal through the antenna 350.

Conversely, when a data signal is received from the wireless network, the high-frequency processor 346 removes noise from the data signal received through the antenna 350. The baseband processor 344 demodulates the data signal received from the high-frequency processor 346 and digitizes the demodulated data signal. The wireless MAC processor 342 performs MAC on the digitized signal on the data link layer and outputs the signal to the conversion gateway 330.

Figure 4:
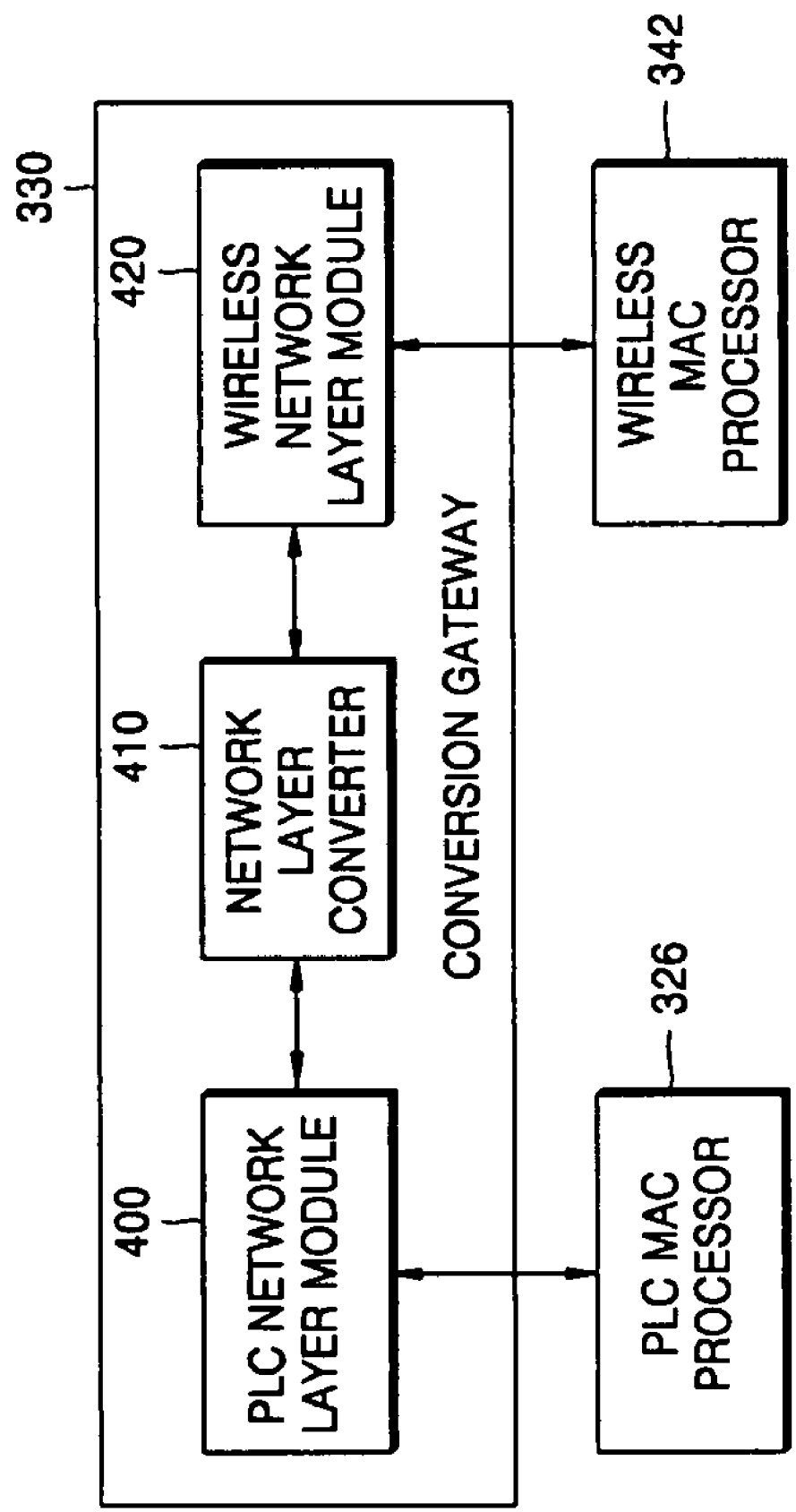
FIG. 4 illustrates the detailed structure of a conversion gateway included in the access pointer shown in FIG. 3.

FIG. 4 illustrates the detailed structure of a conversion gateway included in the access pointer shown in FIG. 3. Referring to FIG. 4, the conversion gateway 330 includes a PLC network layer module 400, a network layer converter 410, and a wireless network layer module 420.

The PLC network layer module 400 and the wireless network layer module 420 perform network layer functions such as address management, flow control, retransmission, etc.

In detail, the PLC network layer module 400 performs a network layer function on data received from the PLC MAC processor 326 and then transmits the data to the network layer converter 410 to transmit the data to a wireless network. The network layer converter 410 separates data for upper layers above the network layer from the data received from the PLC network layer module 400, converts the data to be suitable to an interface on a wireless network layer, and transmits the data to the wireless network layer module 420. The wireless network layer module 420 performs a network layer function on the data received from the network layer converter 410 and transmits the data to the wireless MAC processor 342. A procedure performed by the conversion gateway 330 to transmit data received from a wireless communication network by the wireless communication module 340 to a PLC network is performed in a reverse order.

Figure 5:
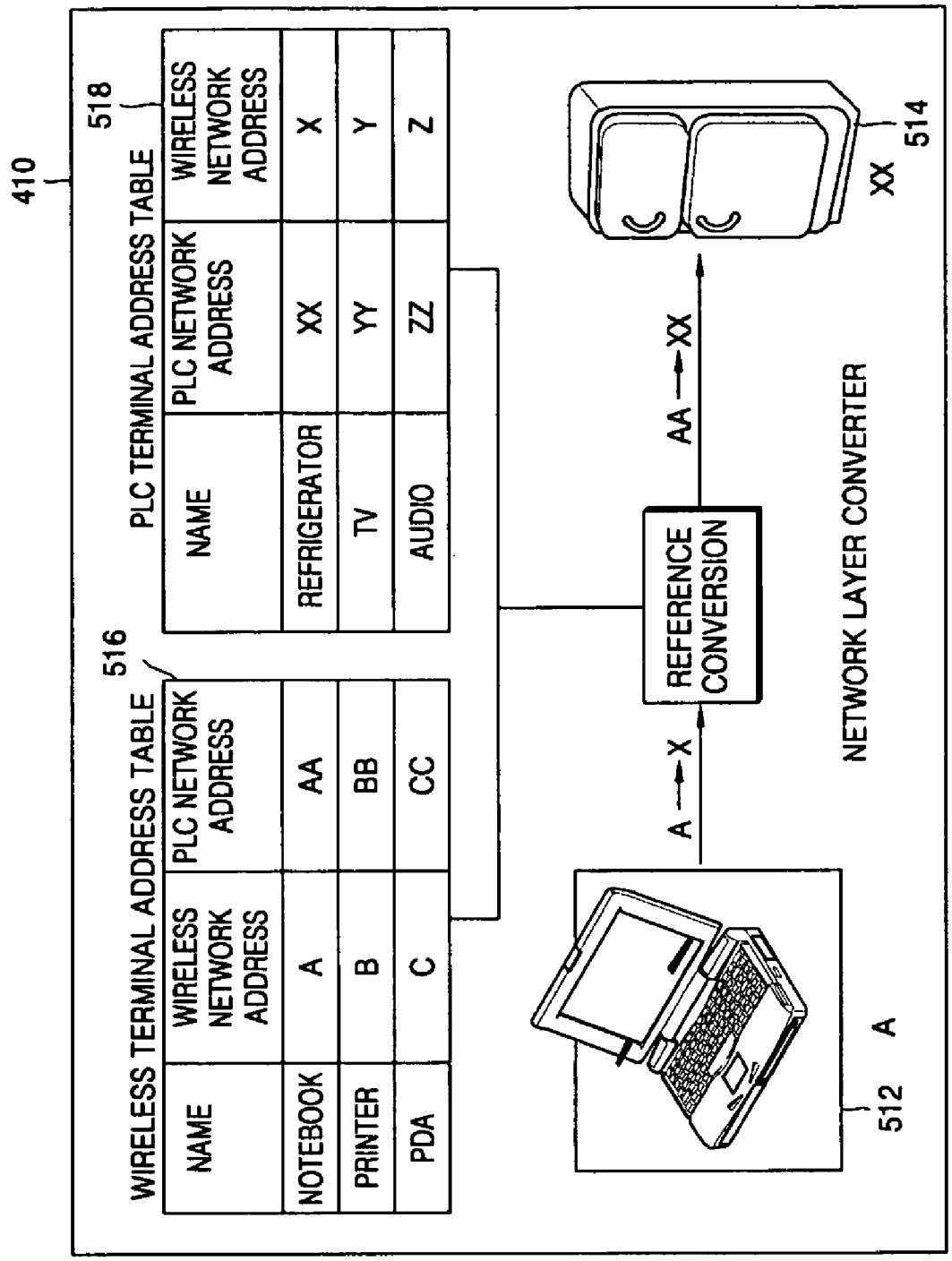
FIG. 5 illustrates a procedure in which a network layer converter converts a network address.

FIG. 5 illustrates a procedure in which the network layer converter 410 converts a network address. When the access pointer according to the embodiment illustrated in FIG. 3 is connected to a power line (i.e., an electric outlet), the access pointer recognizes existence or non-existence of a wireless terminal 512 on a wireless network via a wireless physical layer and a wireless MAC layer. The access pointer generates a private network address corresponding to the wireless network, e.g., an IP address used on a wireless LAN, and allocates the private network address to the wireless terminal 512. In addition, the access pointer generates a PLC network address to communicate with a PLC network. The generated two addresses are stored to be mapped to each other in a wireless terminal address table 516 of the network layer converter 410.

Conversely, with respect to a terminal 514 on the PLC network, the access pointer recognizes existence or non-existence of a PLC terminal 514 via a PLC physical layer and a PLC MAC layer. The access pointer reads a PLC network address or provides a method of setting the PLC network address and provides a wireless IP address to be mapped to the PLC network address. In addition, the access pointer stores the two addresses in a PLC terminal address table 518 so that the two addresses can be mapped to each other with respect to the PLC terminal 514.

After such address generation, when the wireless terminal 512 attempts communicating with the PLC terminal 514 using the wireless IP address generated for the PLC terminal 514, the access pointer according to the embodiment of the present invention converts the wireless IP address of the PLC terminal 514 and the wireless IP address of the wireless terminal 512 into PLC addresses, respectively, referring to the PLC terminal address table 518 and the wireless terminal address table 516 and transmits a communication signal to a PLC network layer. When the PLC terminal 514 attempts communicating with the wireless terminal 512 using the PLC network address allocated to the wireless terminal 512, the network layer converter 410 of the access pointer converts the PLC address of the PLC terminal 514 and the PLC address of the wireless terminal 512 into wireless IP addresses, respectively, referring to the PLC terminal address table 518 and the wireless terminal address table 516, processes a communication signal to be suitable to a wireless network interface, and then transmits the communication signal to a wireless network layer. The IP addresses may be substituted by other network addresses according to a network address provided by a wireless network.

Figure 6:
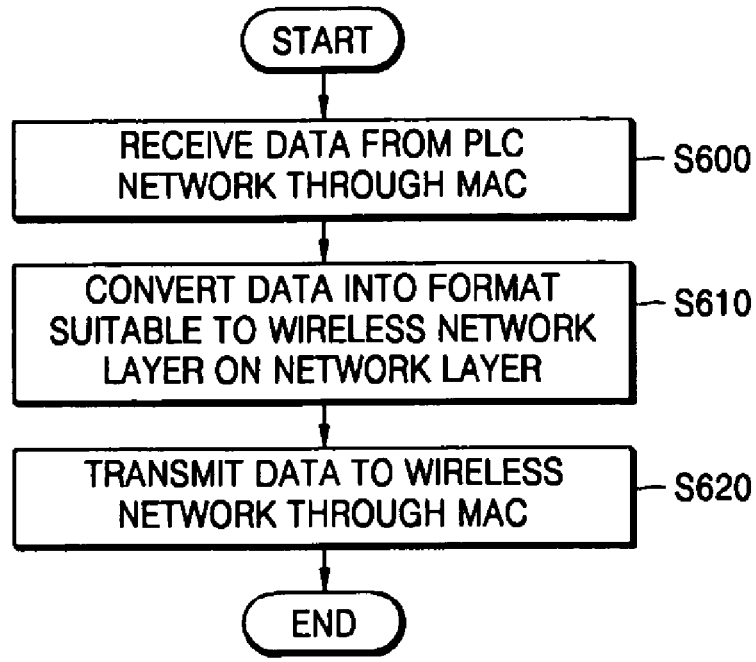
FIGS. 6 and 7 are flowcharts of a method of interconnecting a power line communication (PLC) network and a wireless network according to an embodiment of the present invention.
Figure 7:
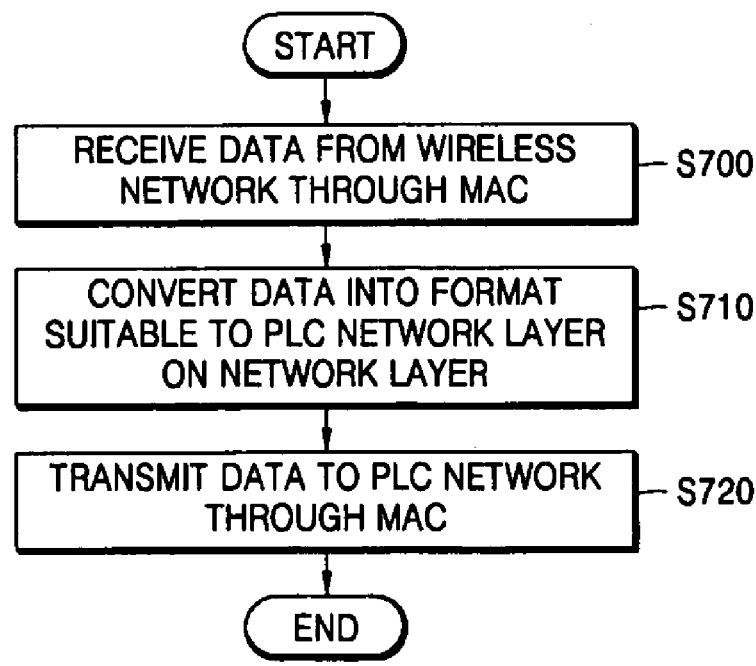

FIGS. 6 and 7 are flowcharts of a method of interconnecting a PLC network and a wireless network according to an embodiment of the present invention. FIG. 6 illustrates a procedure for transmitting data from the PLC network to the wireless network. FIG. 7 illustrates a procedure for transmitting data from the wireless network to the PLC network.

Referring to FIG. 6, in operation S600 data is received from the PLC network through MAC of a data line layer. In operation S610, the data is converted into a format suitable to an interface on a network layer of the wireless network and is applied a wireless network layer function. In operation S620, the converted data is transmitted to the wireless network through the MAC of the data line layer.

Referring to FIG. 7, in operation S700 data is received from the wireless network through MAC of a data line layer. In operation S710, the data is converted into a format suitable to an interface on a network layer of the PLC network and is applied a PLC network layer function. In operation S720, the converted data is transmitted to the PLC network through the MAC of the data line layer.

The present invention provides a wireless network which can be easily interconnected to a conventional home network, which is constructed using a power line, in a plug-in manner, thereby removing causes incurring cost for replacement of existing home gateway equipment and enabling new wireless network equipment to be easily applied to the home network. In addition, taking into account that the home network should allow users to easily use information devices connected to each other at home, the present invention can greatly contribute to the wide spread of the home network in light of cost and convenience.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An access pointer for interconnecting a power line communication (PLC) network and a wireless network, the access pointer comprising:
    a PLC module transmitting and receiving data to and from the PLC network through media access control of a data link layer;
    a wireless communication module transmitting and receiving data to and from the wireless network through media access control of a data link layer;
    a conversion gateway converting data on upper layers above a network layer among the data received through the PLC module into a format suitable for a wireless network layer, outputting the converted data to the wireless communication module, converting data on upper layers above the network layer among the data received through the wireless communication module into a format suitable for a PLC network layer, and outputting the converted data to the PLC module; and
    a wireless terminal address table storm a PLC network address for a wireless terminal to communicate with the PLC network; and
    a PLC terminal address table storing a wireless network IP address for a PLC terminal to communicate with the wireless network.

2. The access pointer of claim 1, further comprising a plug inserted into an electric outlet to connect the PLC module to the PLC network.

3. The access pointer of claim 1, wherein the PLC module comprises:
    a coupler separating a data signal from current flowing in a power line of the PLC network;
    a PLC data processor converting the data signal into a digital signal; and
    a PLC media access control processor performing media access control on the digital signal.

4. The access pointer of claim 1, wherein the conversion gateway comprises:
    a PLC network layer module performing a network layer function including transmission/reception address management, flow control, and retransmission on data on a PLC network layer;
    a wireless network layer module performing a network layer function including transmission/reception address management, flow control, and retransmission on data on a wireless network layer; and
    a network layer converter converting data of the PLC network layer into data of the wireless network layer and converting data of the wireless network layer into data of the PLC network layer.

5. The access pointer of claim 1, wherein the wireless communication module comprises:
    a wireless media access control processor performing media access control on data received from the conversion gateway;
    a baseband processor modulating the data received through the wireless media access control processor; and
    a high-frequency processor performing noise removing and amplification of the modulated data and then transmitting the modulated data to the wireless network through a wireless antenna.

6. A method of interconnecting a power line communication (PLC) network and a wireless network, the method comprising:
    receiving data from the PLC network through media access control of a data link layer;
    converting data on upper layers above a network layer in the received data into a format suitable to a wireless network layer; and
    transmitting the converted data to the wireless network through the media access control of the data link layer, by using a PLC terminal address table storing a wireless network IP address for a PLC terminal to communicate with the wireless network.

7. The method of claim 6, further comprising:
    receiving data from the wireless network through the media access control of the data link layer;
    converting data on upper layers above the network layer in the received data into a format suitable to a PLC network layer; and
    transmitting the converted data to the PLC network through the media access control of the data link layer.

* * * * *